(12) United States Patent
Koziol et al.

(10) Patent No.: US 7,552,863 B2
(45) Date of Patent: Jun. 30, 2009

(54) METHOD FOR UPDATING INDICIA READERS

(75) Inventors: Thomas J. Koziol, Camillus, NY (US); James W. Stewart, East Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 26 days.

(21) Appl. No.: 11/712,176

(22) Filed: Feb. 28, 2007

(65) Prior Publication Data
US 2008/0209411 A1 Aug. 28, 2008

(51) Int. Cl.
G06F 17/00 (2006.01)
G06K 7/00 (2006.01)
G06K 7/10 (2006.01)
G06K 19/06 (2006.01)

(52) U.S. Cl. .................. 235/375; 235/435; 235/454; 235/494; 235/462.01

(58) Field of Classification Search .............. 235/435, 235/375, 454, 494, 462.01
See application file for complete search history.

(56) References Cited

U.S. PATENT DOCUMENTS

| 4,868,375 | A * | 9/1989 | Blanford | 235/462.15 |
| 5,185,514 | A * | 2/1993 | Wike et al. | 235/375 |
| 5,214,268 | A * | 5/1993 | Doing | 235/462.15 |
| 5,837,986 | A * | 11/1998 | Barile et al. | 235/462.01 |
| 6,349,879 | B1 * | 2/2002 | Watanabe et al. | 235/462.15 |
| 6,902,114 | B2 * | 6/2005 | Hashimoto et al. | 235/462.25 |
| 7,027,806 | B2 * | 4/2006 | Rajaram et al. | 455/419 |
| 7,048,192 | B2 * | 5/2006 | Schmidt et al. | 235/462.43 |
| 7,062,763 | B2 * | 6/2006 | Ali-Santosa et al. | 717/168 |
| 7,080,786 | B2 * | 7/2006 | Longacre et al. | 235/462.01 |
| 7,093,760 | B1 * | 8/2006 | Collins, Jr. | 235/462.01 |
| 7,159,783 | B2 * | 1/2007 | Walczyk et al. | 235/472.01 |
| 7,273,179 | B2 * | 9/2007 | Anson et al. | 235/462.46 |
| 7,311,259 | B2 * | 12/2007 | Watanabe et al. | 235/462.14 |
| 7,398,929 | B2 * | 7/2008 | Longacre et al. | 235/462.07 |
| 7,438,217 | B2 * | 10/2008 | Bhella et al. | 235/375 |
| 7,464,878 | B2 * | 12/2008 | Schmidt et al. | 235/472.01 |
| 2001/0007334 | A1 * | 7/2001 | Wilz et al. | 235/462.15 |
| 2002/0023959 | A1 * | 2/2002 | Miller et al. | 235/462.13 |
| 2002/0030105 | A1 * | 3/2002 | Miller et al. | 235/462.13 |
| 2002/0054689 | A1 * | 5/2002 | Zhang et al. | 381/312 |
| 2002/0130181 | A1 * | 9/2002 | Reddersen et al. | 235/462.15 |
| 2002/0185537 | A1 * | 12/2002 | Konda | 235/462.01 |
| 2002/0185540 | A1 * | 12/2002 | Hashimoto et al. | 235/462.25 |
| 2002/0193101 | A1 * | 12/2002 | McAlinden | 455/419 |
| 2003/0001017 | A1 * | 1/2003 | Konda | 235/462.15 |
| 2003/0022663 | A1 * | 1/2003 | Rajaram et al. | 455/419 |
| 2003/0041125 | A1 * | 2/2003 | Salomon | 709/220 |
| 2003/0042311 | A1 * | 3/2003 | Longacre et al. | 235/462.07 |
| 2003/0069007 | A1 * | 4/2003 | Rajaram et al. | 455/419 |
| 2003/0209605 | A1 * | 11/2003 | Walczyk et al. | 235/472.01 |
| 2004/0016812 | A1 * | 1/2004 | Schmidt et al. | 235/462.31 |

(Continued)

Primary Examiner—Daniel Walsh
(74) Attorney, Agent, or Firm—Hiscock & Barclay, LLP

(57) ABSTRACT

A method of operating an indicia reader comprising the steps of: requesting upgrade software from a remote server; the remote server sending in response to the request an information bearing indicia (IBI) to a device local to the indicia reader; providing the IBI on a readable medium; reading the IBI; recognizing in the indicia the presence of indicia upgrade information regarding retrieval of the upgrade software; and, retrieving upgrade software from the remote server in response to the indicia upgrade information.

19 Claims, 5 Drawing Sheets

U.S. PATENT DOCUMENTS

| | | | | |
|---|---|---|---|---|
| 2004/0094627 A1* | 5/2004 | Parker et al. | ............ | 235/472.01 |
| 2004/0222300 A1* | 11/2004 | Strickland | .............. | 235/462.15 |
| 2004/0251307 A1* | 12/2004 | Schmidt et al. | ........ | 235/462.46 |
| 2004/0256464 A1* | 12/2004 | Longacre et al. | ....... | 235/462.45 |
| 2004/0262395 A1* | 12/2004 | Longacre et al. | ....... | 235/462.15 |
| 2005/0199727 A1* | 9/2005 | Schmidt et al. | ........ | 235/462.46 |
| 2005/0284943 A1* | 12/2005 | Walczyk et al. | ........ | 235/472.01 |
| 2006/0006231 A1* | 1/2006 | Anson et al. | ................ | 235/435 |
| 2006/0027653 A1* | 2/2006 | Sato et al. | ................. | 235/435 |
| 2006/0168261 A1* | 7/2006 | Serval et al. | ............... | 709/230 |
| 2006/0175413 A1* | 8/2006 | Longacre et al. | ....... | 235/462.07 |
| 2006/0223517 A1* | 10/2006 | Rajaram et al. | ............. | 455/419 |
| 2006/0238305 A1* | 10/2006 | Loving et al. | .............. | 340/10.1 |
| 2006/0239448 A1* | 10/2006 | Pang et al. | .................. | 379/910 |
| 2007/0063049 A1* | 3/2007 | Anson et al. | ........... | 235/462.46 |
| 2007/0228137 A1* | 10/2007 | Bhella et al. | ................. | 235/375 |
| 2007/0284443 A1* | 12/2007 | Anson et al. | ................ | 235/435 |
| 2008/0093456 A1* | 4/2008 | Pasik et al. | ................ | 235/454 |
| 2008/0121715 A1* | 5/2008 | Field | ..................... | 235/462.25 |
| 2008/0179388 A1* | 7/2008 | Pang et al. | .................. | 235/375 |
| 2008/0209411 A1* | 8/2008 | Koziol et al. | ................. | 717/171 |
| 2008/0230607 A1* | 9/2008 | Etten | ......................... | 235/435 |
| 2009/0031299 A1* | 1/2009 | Karstens | .................... | 717/177 |

* cited by examiner

METHOD FOR UPDATING INDICIA READERS

FIELD OF THE INVENTION

The present invention relates to indicia reading devices, and more particularly to a method of updating an indicia reading device.

BACKGROUND

Indicia reading devices (also referred to as readers, readers, etc.) typically read data represented by printed indicia, (also referred to as symbols, symbology, bar codes, etc.) For instance one type of a symbol is an array of rectangular bars and spaces that are arranged in a specific way to represent elements of data in machine readable form. Optical indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures. Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a network computer.

Conventionally, a reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

BRIEF DESCRIPTION OF THE DRAWINGS

FIG. 2 is a block schematic diagram of an exemplary PDA in accordance with the present invention.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts.

Figure 1:
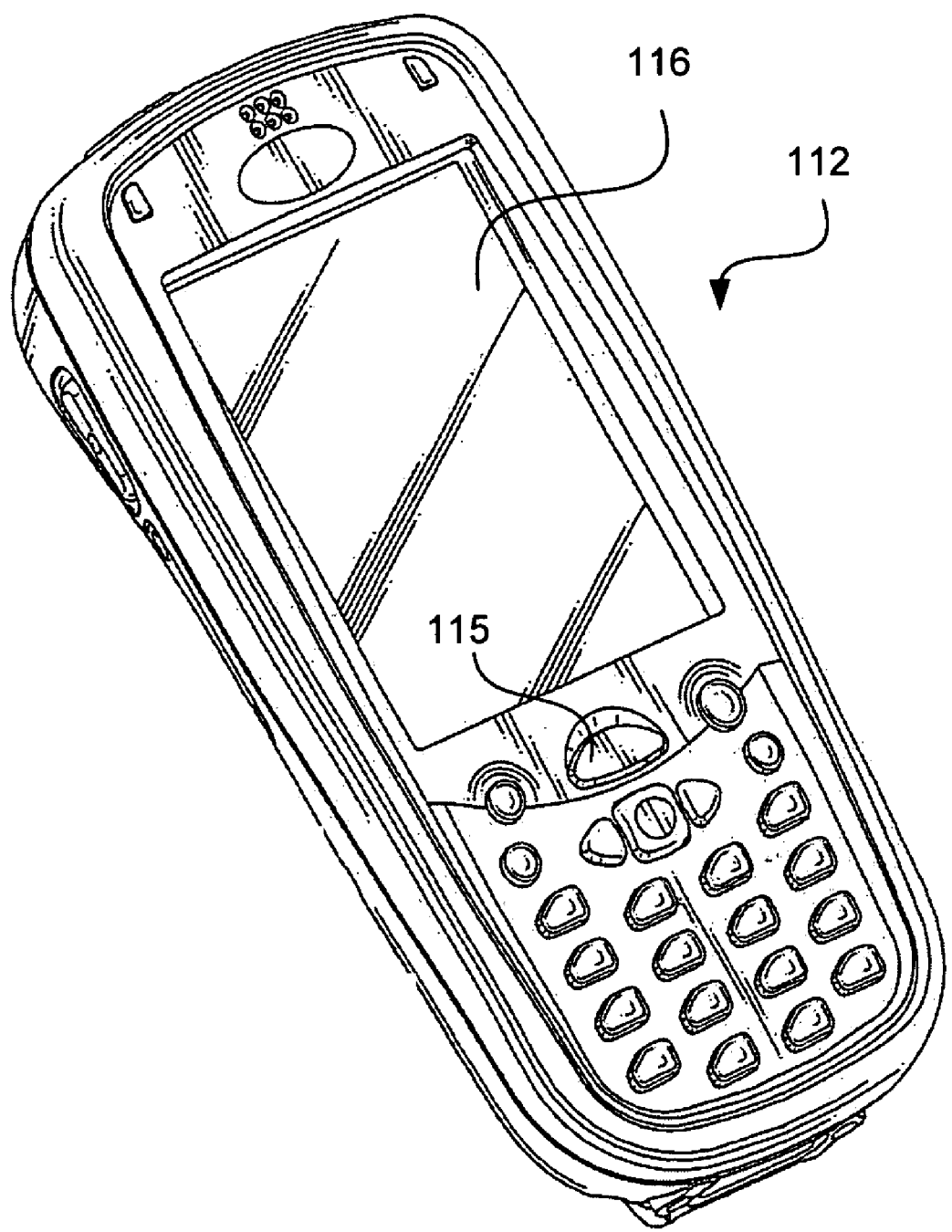
FIG. 1 is a perspective view of an exemplary PDA in accordance with the present invention.
Figure 2:
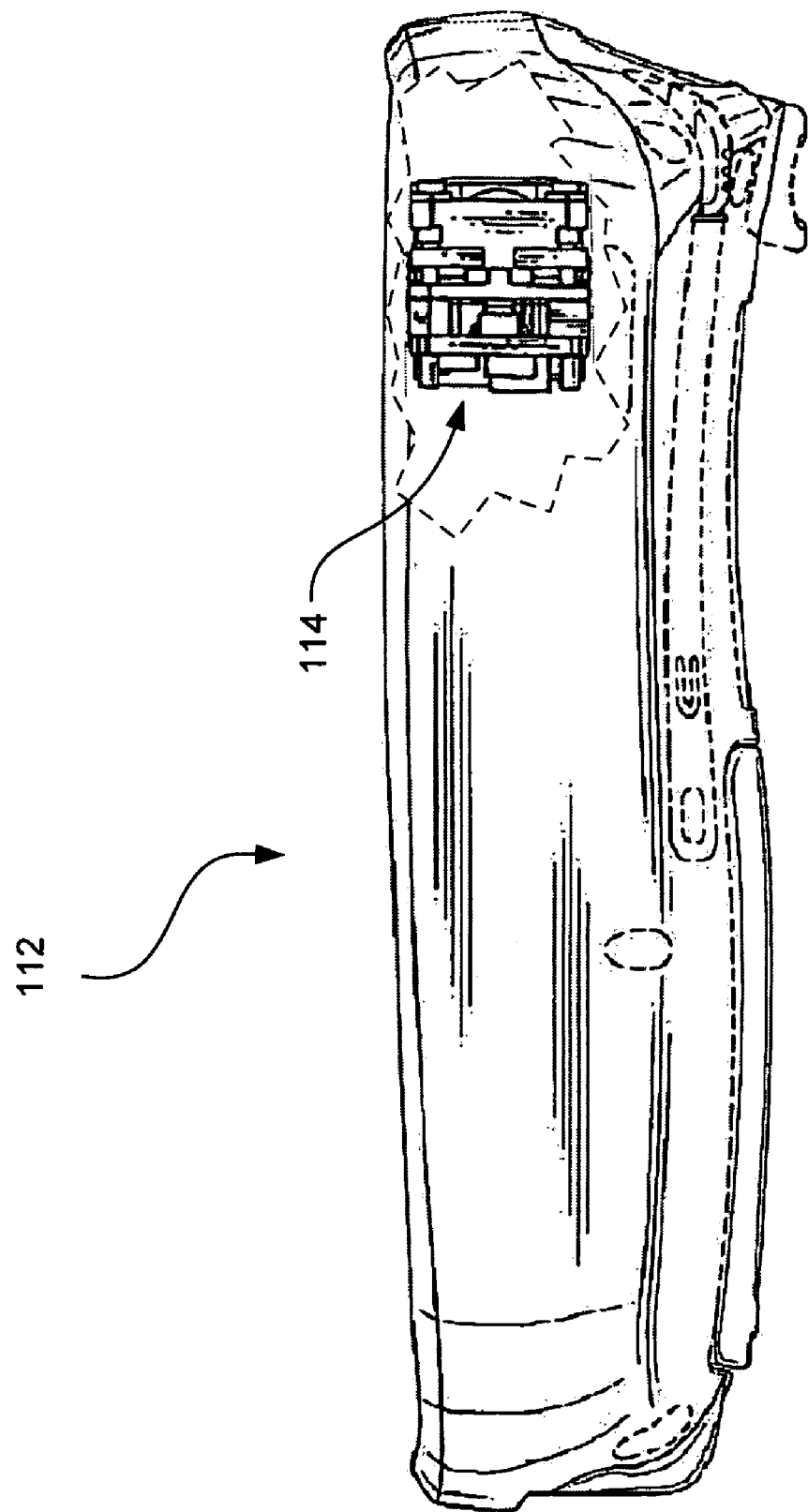
FIG. 2 is a fragmentary partially cutaway side view of an exemplary PDA in accordance with the present invention.

Referring to FIGS. 1 and 2, a reader device, such as a personal digital assistant (PDA) 112 or portable data terminal (PDT) may be a platform for an image reading assembly 114 having the capability for capturing and reading images, some of which may have symbol indicia provided therein. Personal Digital Assistants (PDAs) are typically defined as handheld devices used as a personal organizer, and having many uses such as reading information bearing indicia, calculating, use as a clock and calendar, playing computer games, accessing the Internet, sending and receiving E-mails, use as a radio or stereo, video recording, recording notes, use as an address book, and use as a spreadsheet. A plurality of buttons or keys 115 may be used to control operation of the PDA and the imaging reader assembly 114. A display 116 may be utilized to provide a graphical user interface (GUI).

PDAs may be equipped with the ability to query and receive and transmit data, such as firmware via a communication link, such as by radio link or wired link. Upgrading firmware from host processor to PDA (also referred to as uploading or pushing) and duplicating configuration parameters may be performed by reading specific indicia to ensure PDAs are operating at the proper revision and have the proper configuration parameters.

A PDT is typically an electronic device that is used to enter or retrieve data via wireless transmission (WLAN or WWAN) and may also serve as an indicia reader used in a stores, warehouse, hospital, or in the field to access a database from a remote location.

The PDA 112 may be a Hand Held Products Dolphin® series or the like and may include a cradle connected to a computer by a cable or wireless connection to provide two-way data communication therebetween. The computer may be replaced with a different processing device, such as a data processor, a laptop computer, a modem or other connection to a network computer server, an internet connection, or the like. The PDA may include a display and keys mounted in a case to activate and control various features on the PDA. The display may be a touch screen LCD that allows the display of various icons representative of different programs available on the PDA which may be activated by finger pressure or the touch of a stylus. The display may also be used to show indicia, graphs, tabular data, animation, or the like.

Figure 3:
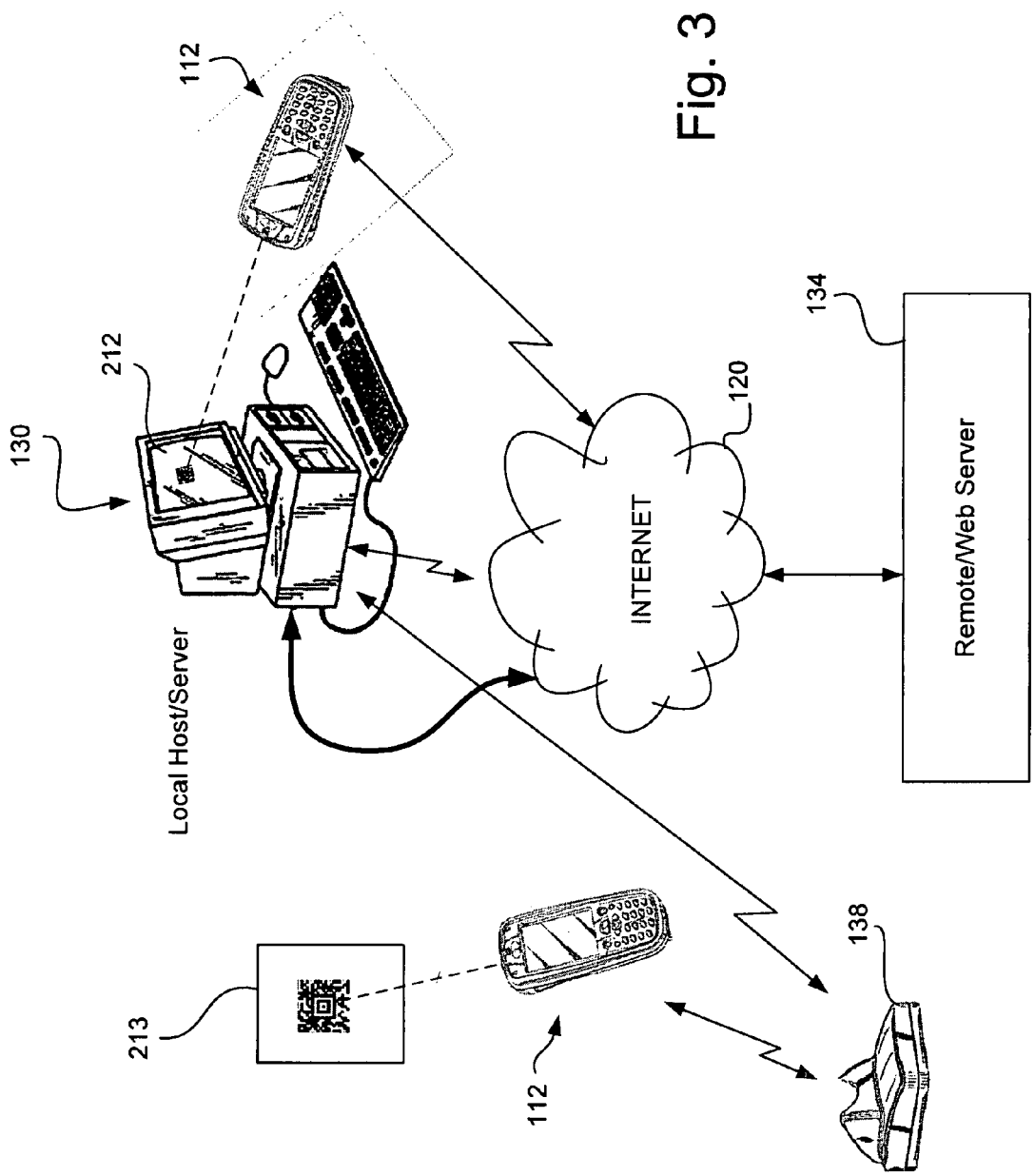
FIG. 3 is a block schematic diagram of an exemplary PDA system in accordance with the present invention.

FIG. 3 illustrates a scanning system configuration in accordance with the present invention, wherein a plurality of readers 112 are being operated or utilized in a remote location, such as in a warehouse or on a delivery truck. Each reader may be in communication (wired or wireless) with the internet through the use of a local processing system 130, such as might be resident on a local server or computer having a wired or wireless router for providing internet service to a device or devices such as PDAs. The local processing system 130 may be in communication via the internet with a remote/web server 134 through a wired or wireless connection for the transfer of information over a distance without the use of electrical conductors or "wires". The distances involved may be short (a few meters as in television remote control) or very long (thousands or even millions of kilometers for radio communications). Wireless communication may involve radio frequency communication. Applications may involve point-to-point communication, point-to-multipoint communication, broadcasting, cellular networks and other wireless networks. This may involve: cordless telephony such as DECT (Digital Enhanced Cordless Telecommunications); Cellular systems such as 0G, 1G, 2G, 3G or 4G; Short-range point-to-point communication such as IrDA or RFID (Radio Frequency Identification), Wireless USB, DSRC (Dedicated Short Range Communications); Wireless sensor networks such as ZigBee; Personal area networks such as Bluetooth or Ultra-wideband (UWB from WiMedia Alliance); Wireless computer networks such as Wireless Local Area Networks (WLAN), IEEE 802.11 branded as WiFi or HIPERLAN; or Wireless Metropolitan Area Networks (WMAN) and Broadband Fixed Access (BWA) such as LMDS, WiMAX or HIPERMAN.

The Internet is the worldwide, publicly accessible network of interconnected computer networks that transmit data by packet switching using the standard Internet Protocol (IP). It is a "network of networks" that consists of millions of smaller domestic, academic, business, and government networks, which together carry various information and services, such as electronic mail, online chat, file transfer, and the interlinked Web pages and other documents of the World Wide Web. The IP is a data-oriented protocol used for communicating data across a packet-switched internetwork, and may be a network layer protocol in the internet protocol suite and encapsulated in a data link layer protocol (e.g., Ethernet). As a lower layer protocol, the IP provides the service of communicable unique global addressing amongst computers to provide a service not necessarily available with a data link layer.

Ethernet provides globally unique addresses and may not be globally communicable (i.e., two arbitrarily chosen Ethernet devices will only be able to communicate if they are on the same bus). IP provides final destinations with data packets whereas Ethernet may only be concerned with the next device (computer, router, etc.) in the chain. The final destination and next device could be one and the same (if they are on the same bus) but the final destination could be remotely located. IP can be used over a heterogeneous network (i.e., a network connecting two computers can be any mix of Ethernet, ATM, FDDI, Wi-fi, token ring, etc.) and does not necessarily affect upper layer protocols.

One or more PDA may be outfitted with a communication module configured to communicate with other PDAs that have an appropriate type communication module. One or more PDA may be configured to communicate with a base unit 138 configured to interface between the PDA and a network.

In the case of a mobile hand held optical PDA hardwired to its individual base unit, this link between the PDA and base unit is fixed and permanent. In the case of a wireless mobile hand held optical PDA that communicates wirelessly with its individual base unit, this link can be made by programming the PDA with information identifying the particular base unit so the PDA directs its transmitted information to that base unit, or vice versa.

The information bearing indicia may be displayed on and read from an exemplary display 212, such as may be disposed on a platform such as PC monitor, mobile phone, portable data terminal (PDT), personal digital assistant (PDA), etc. A Portable Data Terminal, or PDT, is typically an electronic device that is used to enter or retrieve data via wireless transmission (WLAN or WWAN) and may also serve as an indicia reader used in a stores, warehouse, hospital, or in the field to access a database from a remote location. The information bearing indicia may also be printed on a printable medium 213, such as paper and then read by the reader. This would allow for users to receive a "software or firmware update" barcode electronically (i.e. email) and then simply view and scan the barcode on the PC.

In the exemplary embodiment, software or firmware installation may be completed by a user simply by access to a wired or wireless connection to a host server.

The term "scan", "scanning" or "reading" use herein refers to reading or extracting data from an information bearing indicia or symbol.

Figure 4:
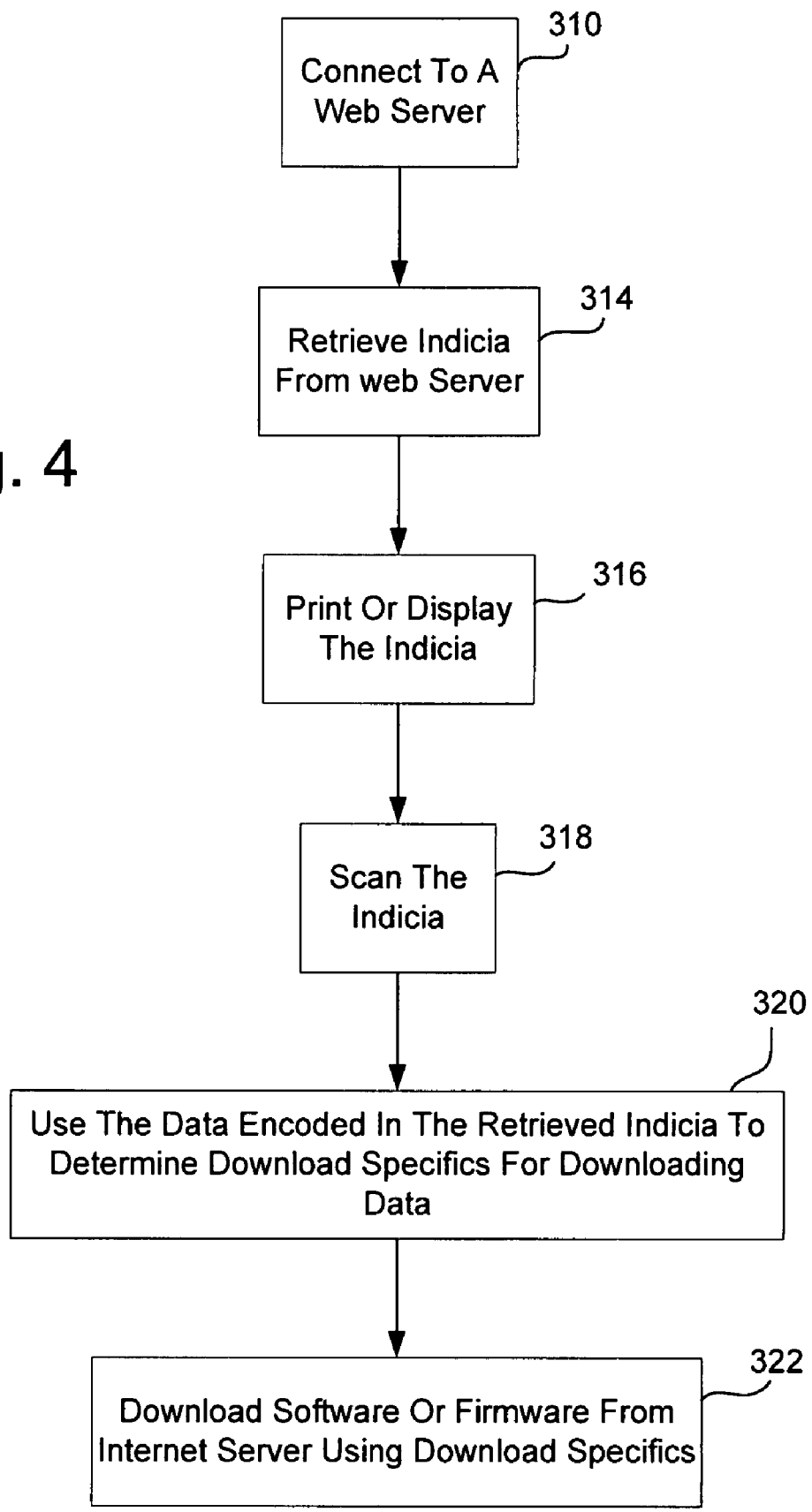
FIG. 4 is a flowchart of an exemplary method of operating a PDA system in accordance with the present invention.

Referring to FIG. 4, illustrates an exemplary flowchart in accordance with the present invention. In a step 310, a reader is connected to a web server, and an information bearing indicia is retrieved from the web server via the internet in a step 314. The information bearing indicia may be sent from the web server to a local processing system 130 or intermediary system and then to the local host/server processing system 130. The retrieved indicia may then be displayed or printed by a system (such as a local processing system 130) in a step 316. The displayed indicia is read by the reader in a step 318. In a step 320, the data encoded in the displayed indicia is utilized to determine download specifics for downloading data. The data may be upgrade software or firmware and may be certain information such as but not limited to: the name or IP address of a connection server; the name of files to download and install; time and date such an update should occur; backup server details in case the primary server is unreachable; installation validation parameters, etc. In a step 322, software or firmware is downloaded from the internet server utilizing the download specifics. The downloaded software may also be referred to as a software upgrade.

Figure 5:
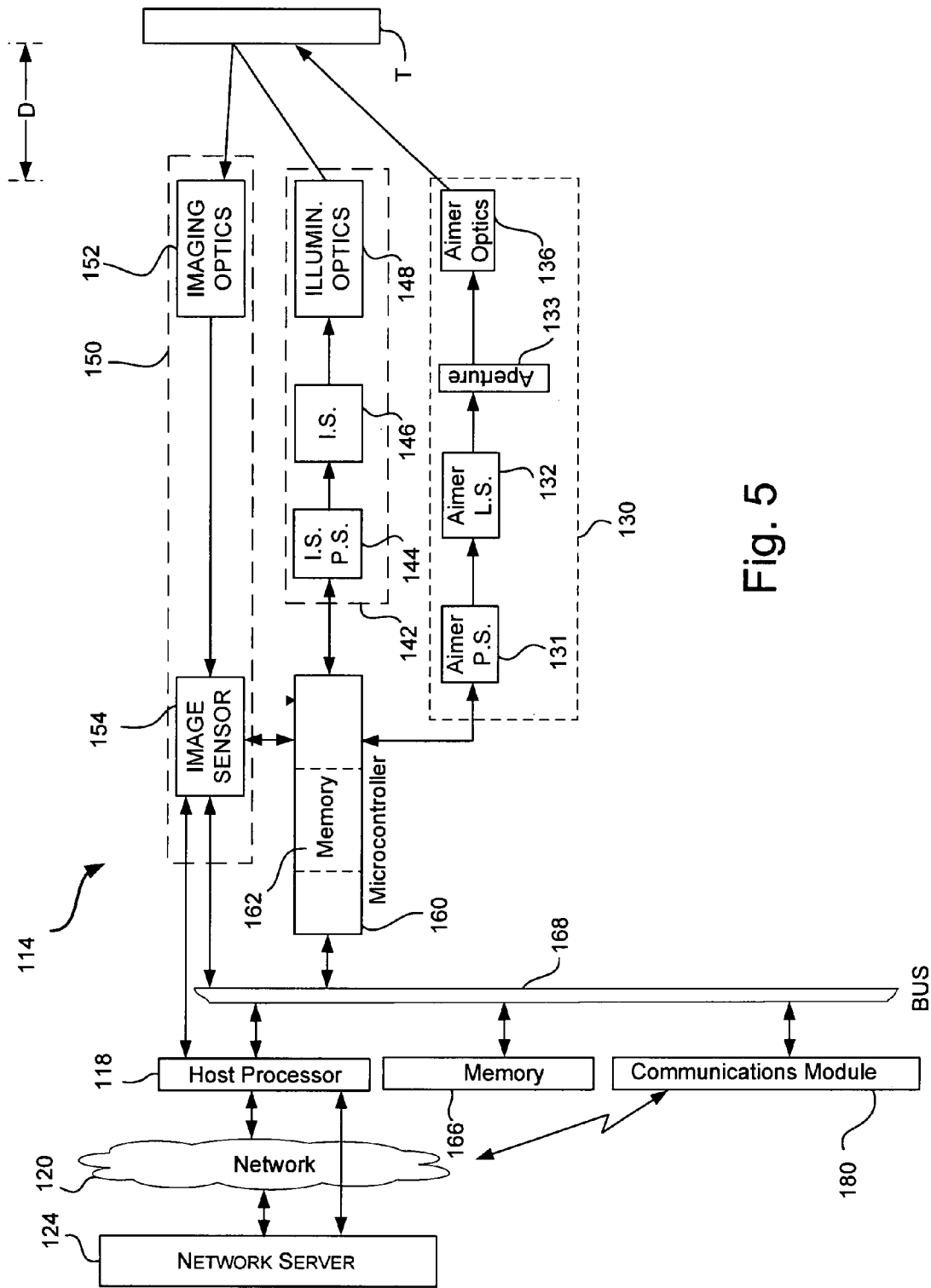
FIG. 5 is a block diagram of an exemplary indicia reader system for a PDA system in accordance with the present invention.

Referring to FIG. 5, imaging reader assembly 114 may have an aiming pattern generator 130, illumination assembly 142, and imaging assembly 150.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the reader at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs 134, such as part number NSPG300A made by Nichia Corporation.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator.

The light sources 132 may also be comprised of one or more laser diodes such as those available from Rohm. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind. Examples of these types of elements are known, commercially available items and may be purchased, for example, from Digital Optics Corp. of Charlotte, N.C. among others. Elements of some of these types and methods for making them are also described in U.S. Pat. No. 4,895,790 (Swanson); U.S. Pat. No. 5,170,269 (Lin et al) and U.S. Pat. No. 5,202,775 (Feldman et al), which are hereby incorporated herein by reference.

Illumination assembly 142 for illuminating target area T may include one or more power supplies 144, illumination sources 146 and illumination optics 148.

Imaging assembly may have receive optics 152 and an image sensor 154.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

The target may be any object or substrate and may bear a 1D or 2D bar code symbol or text or other machine readable indicia. A trigger 115 may be used for controlling full or partial operation of the PDA 112.

Image sensor 154 may be a two-dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc. or model number VC5602V036 36CLCC from STMicroelectronics.

Further description of image sensor operation is provided in commonly owned U.S. patent application Ser. No. 11/077,995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as by illumination from a source located remote from the PDA.

The output of the image sensor may be processed utilizing one or more functions or algorithms to condition the signal appropriately for use in further processing downstream, including being digitized to provide a digitized image of target T.

A microcontroller 160 may be utilized to control one or more functions and devices of the image reader assembly 114 wherein the particulars of the functionality of microcontroller 160 may be determined by or based upon certain parameters which may be stored in memory or firmware. One such function may be controlling the amount of illumination provided by illumination source 146 by controlling the output power provided by illumination source power supply 144.

An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects.

Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash ROM of the microcontroller as a binary image file and may be erased and rewritten. The firmware may be considered "semi-permanent" since it remains the same unless it is updated. This firmware update or load may be handled by a device driver.

The components in reader 112 may be connected by one or more bus 168 or data lines, such as an Inter-IC bus such as an I²C bus, which is a control bus that provides a communications link between integrated circuits in a system. This bus may connect to a remote host computer, server, or processor in relatively close proximity, on or off the same printed circuit board as used by the imaging device. I²C is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

The functional operation of the host processor or local server 118 may involve the performance of a number of related steps, the particulars of which may be determined by or based upon certain parameters stored in memory 166 which may be any one of a number of memory types such as RAM, ROM, EEPROM, etc. In addition some memory functions may be stored in memory 162 provided as part of the microcontroller 160.

One of the functions of the host processor 118 may be to decode machine readable symbology provided within the target or captured image. One dimensional symbologies may include very large to ultra-small, Code 128, Interleaved 2 of 5, Codabar, Code 93, Code 11, Code 39, UPC, EAN, and MSI. Stacked 1D symbologies may include PDF, Code 16K and Code 49. 2D symbologies may include Aztec, Datamatrix, Maxicode, and QR-code. UPC/EAN bar codes are standardly used to mark retail products throughout North America, Europe and several other countries throughout the worlds. Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

In an alternate example, information from the indicia may be preliminarily reviewed or analyzed utilizing software provided in on board memory (i.e. 162 or other) on the reader 112 and processed by an on board device such as microcontroller 160. The preliminary review would identify whether upgrade software is available and perhaps where to access it.

A communications module 180 provides a communication link from imaging reader 114 to other imaging readers or to other remote systems such as host processor 118, memory 166, network 120, or network computer 124.

A further detailed description of indicia reading operation is disclosed in commonly owned published United States Patent Application Publication No. 20030029917 entitled OPTICAL READER FOR IMAGING MODULE and United States Patent Application Publication No. 20030019934 entitled OPTICAL READER AIMING ASSEMBLY COMPRISING APERTURE, United States Patent Application Publication No. 20040134989 entitled DECODER BOARD FOR AN OPTICAL READER UTILIZING A PLURALITY OF IMAGING FORMATS which are hereby incorporated herein by reference.

The information bearing indicia with upgrade data may be considered sensitive information. It may therefore be required that the data be encrypted, wherein the information bearing indicia can be read, but the data in the information bearing indicia is encrypted. Encryption is the conversion of data into a form that cannot be easily understood by unauthorized people. A decrypting algorithm would be required to decrypt such data. Decryption is the process of converting encrypted data back into its original form, so it can be understood. Operation of the decrypting algorithm requires the use of a "key". Encryption key(s) may be secret keys, private keys, or public keys. This encryption key may be provided in the scanner firmware, the host device, in the encrypted barcode or in a separate barcode, which allows the user to decide whether to separate the encryption key from the data or combine them. Encryption keys may be associated by mathematical derivation, symmetry, or other relationship. Encryption keys may updated by pushing the key to the scanner from the host device, or by scanner to scanner communication as discussed hereinbefore.

For example, the scanner may be able to recognize the information bearing indicia as an encrypted information bearing indicia by recognizing a unique unencrypted piece of a data string provided within the information bearing indicia. That same piece of data may also instruct the scanner where to look for the encryption key.

The information bearing indicia may be partially encrypted, which may allow the user only to read an unencrypted part of the information bearing indicia with any scanner. A data formatter may be utilized to strip encrypted data portions before further processing. If the encryption key matches the encrypted information bearing indicia and decoding is completed, the scanner will successfully "read" the data in the information bearing indicia.

If a mismatch between encryption key and information bearing indicia is noticed the scanner may have an "encryption protected" routine with a different sequence of led blinking/beeps, different from an unsuccessful scanner read type situation.

What is described is a method of operating an indicia reader comprising the steps of: scanning information bearing indicia utilizing an indicia reader; recognizing in the indicia the presence of upgrade information regarding retrieval of upgrade software; retrieving upgrade software in response to the upgrade information; and upgrading the reader in accordance with the upgrade software.

Also describe is an indicia reader system comprising: an indicia reader for scanning information bearing indicia; a processor for: recognizing in the indicia the presence of upgrade information regarding retrieval of upgrade software; retrieving upgrade software in response to the upgrade information; and upgrading the reader software in accordance therewith.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A method of operating an indicia reader comprising the steps of:
   electronically requesting upgrade software from a device remote from the indicia reader;
   the device electronically sending in response to the request an information bearing indicia (IBI) to a device local to the indicia reader;
   providing the IBI on a readable medium;
   electronically reading the IBI;
   electronically recognizing in the indicia the presence of indicia upgrade information regarding retrieval of the upgrade software; and,
   electronically retrieving upgrade software from the remote device in response to the indicia upgrade information.

2. A method in accordance with claim 1, wherein the retrieving step comprises:
sending instructions to the local device to retrieve the upgrade software from the remote device; and,
sending the upgrade software from the local device to the indicia reader to thereby upgrade the reader in accordance with the upgrade software.

3. A method in accordance with claim 1, wherein the retrieving step comprises:
sending upgrade software to the indicia reader from the remote device; and,
upgrading the reader in accordance with the upgrade software.

4. A method in accordance with claim 1, wherein the retrieving step comprises retrieving via the internet.

5. A method in accordance with claim 1, wherein the retrieving step is accomplished via a wireless communication.

6. A method in accordance with claim 1, wherein the upgrade information is encrypted.

7. A method in accordance with claim 1, wherein the indicia reader is an optical reader.

8. A method in accordance with claim 1, wherein the retrieving step comprises retrieving from a remote processor or server.

9. A method in accordance with claim 1, wherein the providing step comprises displaying the IBI on a display.

10. A method in accordance with claim 1, wherein the providing step comprises printing the IBI on a printable medium.

11. An indicia reader system comprising:
an indicia reader adapted to send a software upgrade request;
a remote server adapted to receive the software upgrade request and send an information bearing indicia (IBI) in response to the request;
device local to the indicia reader adapted to receive and display the IBI on a display medium;
wherein the indicia reader reads the displayed IBI, recognizes the presence of upgrade information in the displayed indicia regarding retrieval of upgrade software and receives upgrade software from the remote server in response to the upgrade information.

12. An indicia reader system in accordance with claim 11, wherein the remote server sends the upgrade software to the indicia reader via the local device to thereby upgrade the reader in accordance with the upgrade software.

13. An indicia reader system in accordance with claim 11, wherein the remote server sends the upgrade software to the indicia reader and the reader is upgraded in accordance with the upgrade software.

14. An indicia reader system in accordance with claim 11, wherein the software upgrade request and IBI are sent via the internet.

15. An indicia reader system in accordance with claim 11, wherein the upgrade software is transmitted via a wireless communication.

16. An indicia reader system in accordance with claim 11, wherein the upgrade information is encrypted.

17. An indicia reader system in accordance with claim 11, wherein the indicia reader is an optical reader.

18. An indicia reader system in accordance with claim 11, wherein the IBI is displayed on a display.

19. An indicia reader system in accordance with claim 11, wherein the IBI is printed on a printable medium.

* * * * *